May 1, 1928.
M. P. HANSEN
RESILIENT SEAT SUPPORT
Filed July 2, 1927
1,668,014
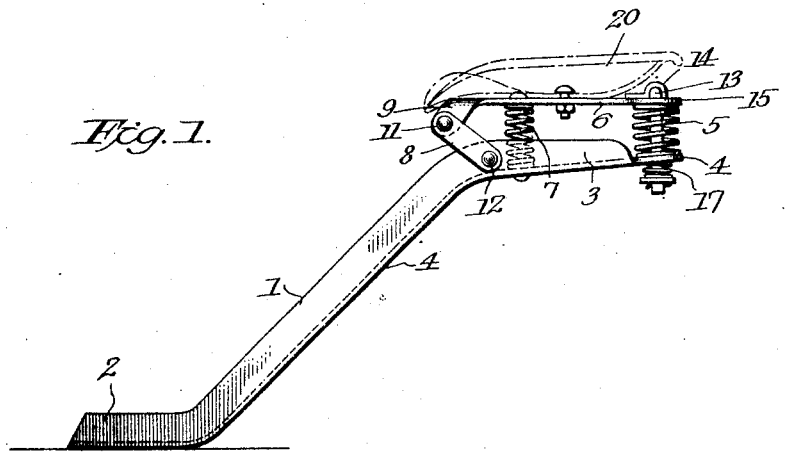
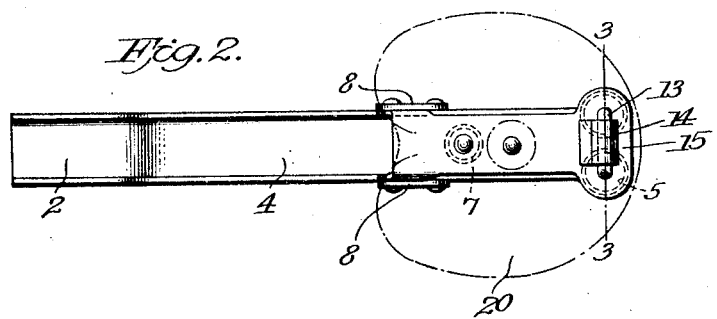
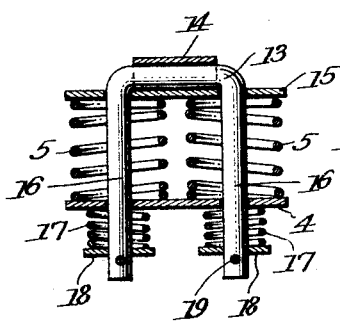
Inventor
Mads Peter Hansen
By Emery, Booth, Janney & Varney
his Attorney Patented May 1, 1928.

1,668,014

UNITED STATES PATENT OFFICE.

MADS PETER HANSEN, OF OAKLAND, NEBRASKA, ASSIGNOR TO ANNA M. NELSON, OF OAKLAND, NEBRASKA.

RESILIENT SEAT SUPPORT.

Application filed July 2, 1927. Serial No. 203,170.

This invention relates to a resilient seat support, particularly adapted for use upon agricultural implements, although not limited thereto, and aims to provide an improved seat characterized by simplicity and ruggedness of construction and free from parts or materials which would be subject to deterioration by exposure to the weather. The invention further aims to utilize in the construction parts which are standard in the manufacture of agricultural implements or which require but little change or modification from parts which are commonly used in this trade.

Further advantages of my invention will be apparent from the following description of the illustrative embodiment shown in the accompanying drawings, in which drawings like reference characters refer to like parts throughout, and wherein Fig. 1 is a side view of my improved seat construction, partly in section;

Fig. 2 is a top plan view wherein the seat proper is shown only in outline in dotted lines; and Fig. 3 is a transverse section on lines 3—3, Fig. 2, showing the principal springs and yoke.

My improved seat comprises a suitable support 1 consisting of a reversely bent channel bar having approximately horizontal top and bottom sections 2 and 3 and an inclined intermediate section 4, said bar being adapted to be mounted by its lower section 2 upon any suitable portion of the implement and to carry on its upper section 3 the seat assembly, all in the manner now common in the art, as will be apparent from Fig. 1. The sides of the channel bar become shallower from front to rear along the top section 3, and are flattened out at the rear end into the plane of the web, forming a broad flat surface 4 affording a support or seat for springs 5, as described in detail below.

The seat assembly comprises a base plate 6 normally supported in a substantially horizontal plane by spiral springs 5 and 7, which springs also serve to space said base plate from the upper relatively horizontal portion 3 of the channel bar 1. This base plate 6 is connected by links 8 to the forward portion of the upper part 3 of the channel bar 1, forwardly inclined down struck ears 9 being provided at the front end of said plate for the reception of pivots 11 or other suitable connections to said links, the lower ends of said links being pivoted as at 12 to the sides of the channel bar. The arms of an inverted U-shaped yoke 13, best seen in Fig. 3, pass down through two holes in the rear end of the base plate 6 and corresponding holes in the flattened end 4 of the channel bar support, said holes being enough larger than the diameter of the arms to permit considerable play. The yoke 13 is loosely hinged to said base plate 6 by a lug 14, which is secured to said plate by any suitable means, such as riveting or welding. The rear end of the plate 6 is widened, as at 15, to provide a seat for the upper ends of the spiral springs, 5 which are inserted between the bearing surfaces 4 and 15. The arms 16 of the yoke 13 extend a sufficient distance below the support 4 to carry lighter spiral springs 17, the upper ends of which bear against the under side of the support, and the lower ends of which are secured to said arms in any suitable manner, as by washers 18 and cotter pins 19. The forward end of the seat assembly is resiliently supported by the somewhat lighter spiral spring 7, arranged between the plate 6 and the horizontal section 3 of the channel bar 1, the ends of which spring are held in place by studs or rivets projecting down from the plate and up from the bar, respectively.

The saddle 20, or seat proper of my invention, is here shown as a standard stamped sheet metal farm implement seat, and may be bolted to the plate 6.

In operation the plate 6, carrying the seat 20, is allowed a downward and forward movement by the travel of the links 8 about their upper and lower pivots 11 and 12, and by the loose fit of the yoke 13 in relation to the plate 6 and support 4. By the combined effect of the links and yoke side-sway is eliminated, and violent vertical bouncing on the springs is largely prevented by the effect of the links in introducing a lengthwise horizontal component into the motion of the supporting plate 6. This lengthwise motion is controlled by the springs and is of assistance in easing shocks which are due to irregularities of traction and which tend to throw the rider back and forward rather than up and down. Since the weight of the rider is well toward the rear of the plate the rear springs 5 may advantageously be heavier than the front spring 7. The cutting away of the sides of the channel towards the rear permits the rear end of the plate to move down to the full extent of compression of the springs 5 without the saddle 20 coming to contact with the sides of the channel.

It will be understood that while I have shown and described my invention as used in connection with farm implements it is not limited to such use but may be applied generally as, for example, to seats of road machinery, bicycles, motorcycles and the like. The plate 6 may be used in conjunction with any suitable type of saddle.

It is to be understood that I do not limit myself to the form of invention herein shown and described but may embody the principles thereof in any suitable manner within the scope of the appended claims.

What I claim is:

1. A resilient seat comprising, in combination, a support including a substantially horizontal portion, a plate substantially parallel to said portion, upwardly and forwardly inclined links pivotally connected to said support and to the front end of said plate, a yoke hinged to the rear end of said plate and guided in said support, springs at front and rear separating said support from said plate, and a saddle fixed to said plate.

2. A resilient seat comprising, in combination, a support including a substantially horizontal portion, a plate substantially parallel to said portion, upwardly and forwardly inclined links pivotally connected to said support and to the front end of said plate, a yoke hinged to the rear end of said plate, and equipped with springs opposing upward movement of said plate, other springs opposing downward movement of said plate, and a saddle fixed to said plate.

3. In a seat for agricultural implements, in combination, a support, a substantially horizontal plate, a saddle carried by said plate, resilient means at both ends of said plate supporting it above said support, a pivoted link connection between said support and the forward end of said plate permitting forward and downward movement thereof and a hinged yoke connection between said support and the rear end of said plate permitting downward movement of the latter but restricting its upward movement.

4. A seat comprising, in combination, a channel bar bent into sections successively horizontal, upwardly inclined, and horizontal, the sides of said last-named horizontal section being reduced in depth from front to rear and flattened out at the rear, a pair of holes in said flattened portion, a plate of like width as said channel bar, said plate having down-struck forwardly inclined ears on its forward end a widened rear end and a pair of holes therein, links pivoted near the forward part of said last-named horizontal section of said channel bar and also pivoted to said ears, a lug on the rear portion of said plate, an inverted U-shaped yoke held beneath said lug, arms on said yoke passing through said pairs of holes, resilient means surrounding said arms and supporting the rear end of said plate, other resilient means supporting the forward end of said plate, and a saddle carried by said plate, said members coacting to permit shock-absorbing lengthwise and vertical movement of said plate and saddle upon said support.

5. A seat comprising a standard having a substantially horizontal transverse support at its ends, a plate having a wide seat at its rear end overlying said support and downwardly projecting lugs at its front end, a pair of links pivoted to said lugs and pivotally connected to said standard below and to the rear of the front end of said plate, spring means between the front end of said plate and said standard, a yoke passing through openings in said support and pivoted to the rear end of said plate, springs on the arms of said yoke between said plate and support, and means upon the ends of said arms for securing them from springing out of said holes.

In testimony whereof, I have signed my name to this specification.

MADS PETER HANSEN.